United States Patent
Yaworski et al.

(10) Patent No.: US 9,786,412 B2
(45) Date of Patent: Oct. 10, 2017

(54) CABLE MOISTURE SEAL ASSEMBLIES, SYSTEMS AND METHODS

(71) Applicant: Tyco Electronics Corporation, Berwyn, PA (US)

(72) Inventors: Harry Yaworski, Cary, NC (US); James Head, Lilburn, GA (US); Alan Tse, Apex, NC (US); Miguel Contreras, Fuquay-Varina, NC (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 14/662,509

(22) Filed: Mar. 19, 2015

(65) Prior Publication Data

US 2016/0276065 A1    Sep. 22, 2016

(51) Int. Cl.
*H02G 15/184*    (2006.01)
*H01B 7/282*    (2006.01)
(Continued)

(52) U.S. Cl.
CPC ......... *H01B 7/2825* (2013.01); *H01B 7/1855* (2013.01); *H01B 13/0026* (2013.01);
(Continued)

(58) Field of Classification Search
CPC .......... H02G 15/01315; H02G 15/184; H01R 9/0509; H01R 9/0512
(Continued)

(56) References Cited

U.S. PATENT DOCUMENTS 3,787,607 A * 1/1974 Schlafly ............... H02G 15/085
                                                              156/49
4,383,131 A * 5/1983 Clabburn ............... H02G 15/10
                                                              156/49
(Continued)

FOREIGN PATENT DOCUMENTS

WO    WO 2006/002650 A1    1/2006

OTHER PUBLICATIONS

Product Installation Instructions, *Cableseal-T Cable Inspection Seal for Tape Shield*, Raychem for TE Connectivity, Jul. 10, 2014, 4 pages.
(Continued)

*Primary Examiner* — Chau N Nguyen
(74) *Attorney, Agent, or Firm* — Myers Bigel, P.A.

(57) ABSTRACT

A sealed cabled assembly includes a cable and a cable moisture seal assembly. The cable includes a cable subcore, a metal shield layer surrounding the cable subcore, and a jacket surrounding the metal shield layer. The cable subcore includes an electrical conductor surrounded by an electrical insulation layer. The cable moisture seal assembly includes a sealant, a electrically conductive jumper member, and an outer sleeve. The cable includes a sealing region section extending from a first axial end to a second axial end, and in which a section of the jacket and a section of the metal shield layer are removed to expose a section of the cable subcore. The insulation layer and the conductor extend through the sealing region section. First and second sections of the jacket extend away from the sealing region section in first and second opposed directions, respectively. First and second sections of the metal shield layer extend away from the sealing region section in the first and second opposed directions, respectively. The outer sleeve surrounds the sealing region section. The sealant is disposed radially between the cable subcore and the outer sleeve, and engages
(Continued)

the cable subcore to form a moisture barrier in the sealing region section between the first and second sections of the jacket. The jumper member electrically connects the first and second sections of the metal shield layer.

18 Claims, 7 Drawing Sheets

(51) Int. Cl.
|  |  |
| --- | --- |
| *H02G 1/14* | (2006.01) |
| *H02G 15/08* | (2006.01) |
| *H01B 7/18* | (2006.01) |
| *H01B 13/00* | (2006.01) |
| *H01B 13/22* | (2006.01) |
| *H01B 13/26* | (2006.01) |

(52) U.S. Cl.
CPC ......... *H01B 13/221* (2013.01); *H01B 13/262* (2013.01); *H02G 1/14* (2013.01); *H02G 15/08* (2013.01)

(58) Field of Classification Search
USPC ..................................... 174/73.1, 77 R, 75 C
See application file for complete search history.

(56) References Cited

U.S. PATENT DOCUMENTS

| | | | |
|---|---|---|---|
| 4,434,320 A * | 2/1984 | Klein | F16L 13/004 |
| | | | 174/23 R |
| 4,755,241 A | 7/1988 | Steinberg | |
| 5,821,459 A * | 10/1998 | Cheenne-Astorino | H02G 15/103 |
| | | | 174/73.1 |
| 6,103,975 A * | 8/2000 | Krabs | H02G 15/103 |
| | | | 174/74 A |
| 8,986,073 B2 | 3/2015 | Kehl et al. | |
| 2010/0279542 A1 | 11/2010 | Seraj et al. | |
| 2011/0011484 A1* | 1/2011 | Evoniuk | H02G 15/1833 |
| | | | 138/177 |
| 2014/0262500 A1 | 9/2014 | Yaworski | |

OTHER PUBLICATIONS

Notification of Transmittal of the International Search Report and the Written Opinion of the International Searching Authority, or the Declaration, in corresponding PCT Application No. PCT/US2016/022779, dated Jun. 24, 2016 (11 pages).

\* cited by examiner

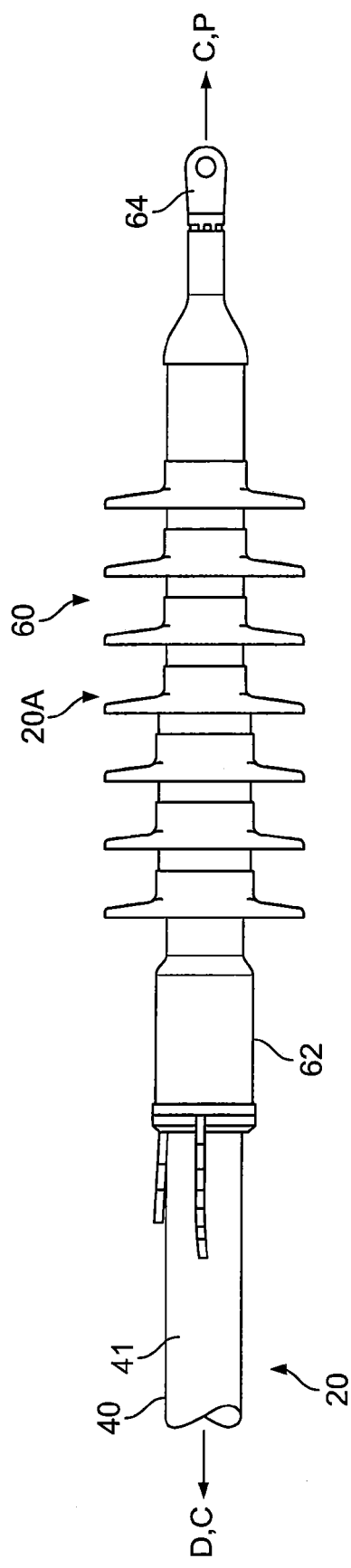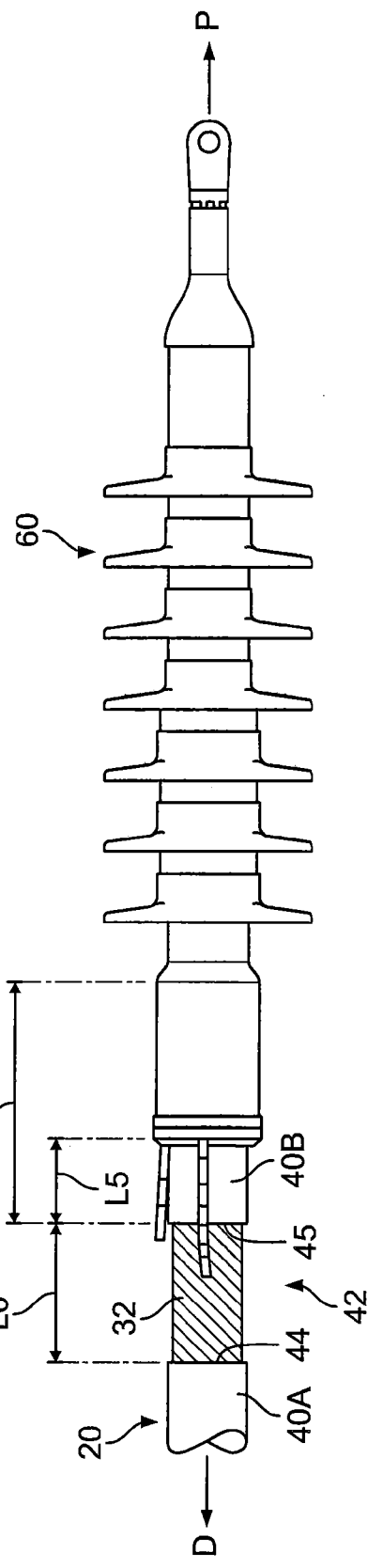
Fig. 2
Fig. 3

CABLE MOISTURE SEAL ASSEMBLIES, SYSTEMS AND METHODS

FIELD OF THE INVENTION

The present invention relates to electrical power distribution cables and, more particularly, to environmental protection for electrical power distribution cables and cable terminations.

BACKGROUND OF THE INVENTION

In the electrical utilities industry, maintaining cable integrity may be critical. A loss of cable integrity, for example, a short circuit in a high voltage cable, may result in a crippling power outage or, even worse, a loss of life. Ingress of moisture into cable terminations and the like may degrade cable integrity and longevity.

SUMMARY OF THE INVENTION

According to embodiments of the invention, a sealed cabled assembly includes a cable and a cable moisture seal assembly. The cable includes a cable subcore, a metal shield layer surrounding the cable subcore, and a jacket surrounding the metal shield layer. The cable subcore includes an electrical conductor surrounded by an electrical insulation layer. The cable moisture seal assembly includes a sealant, a electrically conductive jumper member, and an outer sleeve. The cable includes a sealing region section extending from a first axial end to a second axial end, and in which a section of the jacket and a section of the metal shield layer are removed to expose a section of the cable subcore. The insulation layer and the conductor extend through the sealing region section. First and second sections of the jacket extend away from the sealing region section in first and second opposed directions, respectively. First and second sections of the metal shield layer extend away from the sealing region section in the first and second opposed directions, respectively. The outer sleeve surrounds the sealing region section. The sealant is disposed radially between the cable subcore and the outer sleeve, and engages the cable subcore to form a moisture barrier in the sealing region section between the first and second sections of the jacket. The jumper member electrically connects the first and second sections of the metal shield layer.

According to method embodiments of the invention, a method for forming a sealed cable assembly includes providing a cable including a cable subcore, a metal shield layer surrounding the cable subcore, and a jacket surrounding the metal shield layer. The cable subcore includes an electrical conductor surrounded by an electrical insulation layer. The method further includes removing a section of the jacket and removing a section of the metal shield layer to form a sealing region section extending from a first axial end to a second axial section and wherein a section of the cable subcore is exposed, wherein the insulation layer and the conductor extend through the sealing region section. First and second sections of the jacket extend away from the sealing region section in first and second opposed directions, respectively. First and second sections of the metal shield layer extend away from the sealing region section in the first and second opposed directions, respectively. The method further includes: applying a sealant to the cable subcore; electrically connecting the first and second sections of the metal shield layer using an electrically conductive jumper member; and mounting an outer sleeve to surround the sealing region section. The sealant is disposed radially between the cable subcore and the outer sleeve, and engages the cable subcore to form a moisture barrier in the sealing region section between the first and second sections of the jacket.

According to embodiments of the invention, a cable moisture seal system is provided for forming a moisture seal barrier in an electrical cable including a cable subcore, a metal shield layer surrounding the cable subcore, and a jacket surrounding the metal shield layer, wherein the cable subcore includes an electrical conductor surrounded by an electrical insulation layer. The cable moisture seal system includes an inner sealant, an outer sealant, a jumper member, a pair of spring clamps, and an outer sleeve.

Further features, advantages and details of the present invention will be appreciated by those of ordinary skill in the art from a reading of the figures and the detailed description of the embodiments that follow, such description being merely illustrative of the present invention.

BRIEF DESCRIPTION OF THE DRAWINGS

FIGS. 2-13 illustrate a series of steps for installing the cable sealing system on the cable of FIG. 1 to form a cable moisture seal assembly on the cable.

DETAILED DESCRIPTION OF EMBODIMENTS OF THE INVENTION

Figure 1:
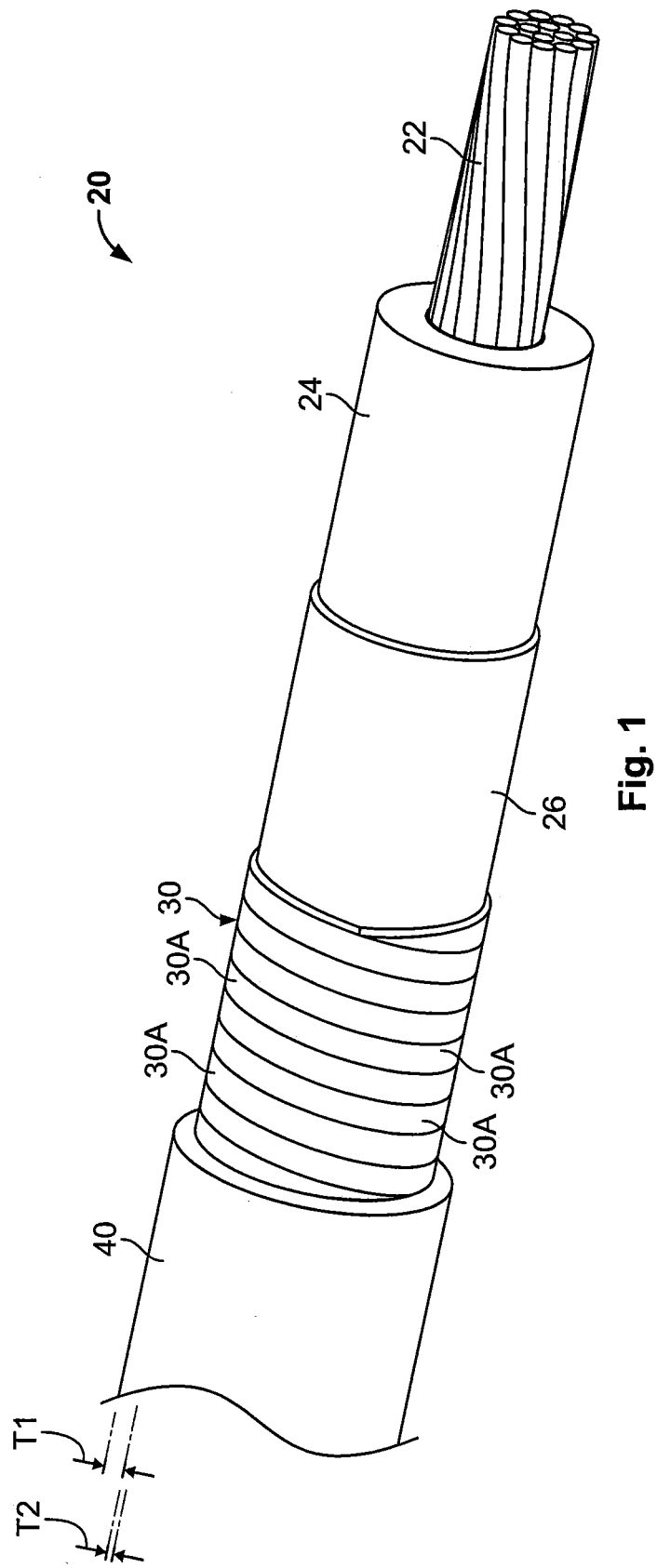
FIG. 1 is a perspective view of an electrically insulated electrical power transmission cable for use with a cable sealing system according to embodiments of the invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

With reference to FIGS. 1-14, an electrical power distribution cable 20 is shown therein with a cable moisture seal assembly 101 according to embodiments of the invention installed thereon. The cable moisture seal assembly 101 is constructed using a cable sealing system 100 that, in some embodiments, is provided to the installer packaged as a pre-assembled kit of components. In the illustrative embodiment, an end termination 60 is also mounted in on a terminal end of the cable 20.

According to some embodiments, the cable 20 is a medium-voltage power transmission cable (between about 15 and 35 kV) or high-voltage power transmission cable (between about 46 and 138 kV). According to some embodiments, the cable 20 is a concentric neutral cable. According to some embodiments, the cable 20 is a metal tape shielded cable. The cable 20 has a longitudinal cable axis C-C (FIG. 2).

As shown in FIG. 1, the cable 20 includes a primary electrical conductor 22, a tubular polymeric insulation layer 24, a tubular semiconductor layer 26, a tubular metal electromagnetic radiation shield layer 30, and a tubular jacket 40, with each component being concentrically surrounded by the next.

According to some embodiments and as shown, the shield layer 30 is a metal tape, foil, strip or sheath fully circumferentially surrounding the semiconductor layer 26 along the length of the cable. More particularly, in some embodiments and as illustrated, the shield layer 30 is formed by a continuous metal strip that is helically wrapped as a series of overlapping or non-overlapping winding segments 30A about the semiconductor layer 26. In other embodiments, the shield layer 30 may be formed by a longitudinally extending metal strip that is wrapped circumferentially about the semiconductor layer 26. According to some embodiments, the cable 20 is an LC shielded cable and the shield layer 30 is a thin corrugated metal layer. In other embodiments, the shield layer 30 may include individual wires, which may be helically wound about the semiconductor layer 26.

The primary conductor 22 may be formed of any suitable electrically conductive materials such as copper (solid or stranded). According to some embodiments, the primary conductor 22 has a diameter in the range of from about 0.5 to 4 inches.

The polymeric insulation layer 24 may be formed of any suitable electrically insulative material such as crosslinked polyethylene (XLPE) or EPR. According to some embodiments, the polymeric insulation layer 24 has a thickness in the range of from about 130 to 840 mils.

The semiconductor layer 26 may be formed of any suitable semiconductor material such as carbon black with silicone. According to some embodiments, the semiconductor layer 26 has a thickness in the range of from about 15 to 100 mils.

The shield layer 30 may be formed of any suitable electrically conductive material such as metal. In some embodiments, the shield layer 30 is formed of copper. According to some embodiments, the shield layer 30 has a thickness T1 (FIG. 1) in the range of from about 5 to 100 mils.

The jacket 40 may be formed of any suitable material. According to some embodiments, the jacket 40 is formed of a polymeric material. In some embodiments, the jacket 40 is formed of EPDM or PVC. According to some embodiments, the jacket 40 has a thickness T2 (FIG. 1) in the range of from about 100 to 350 mils.

Figure 12:
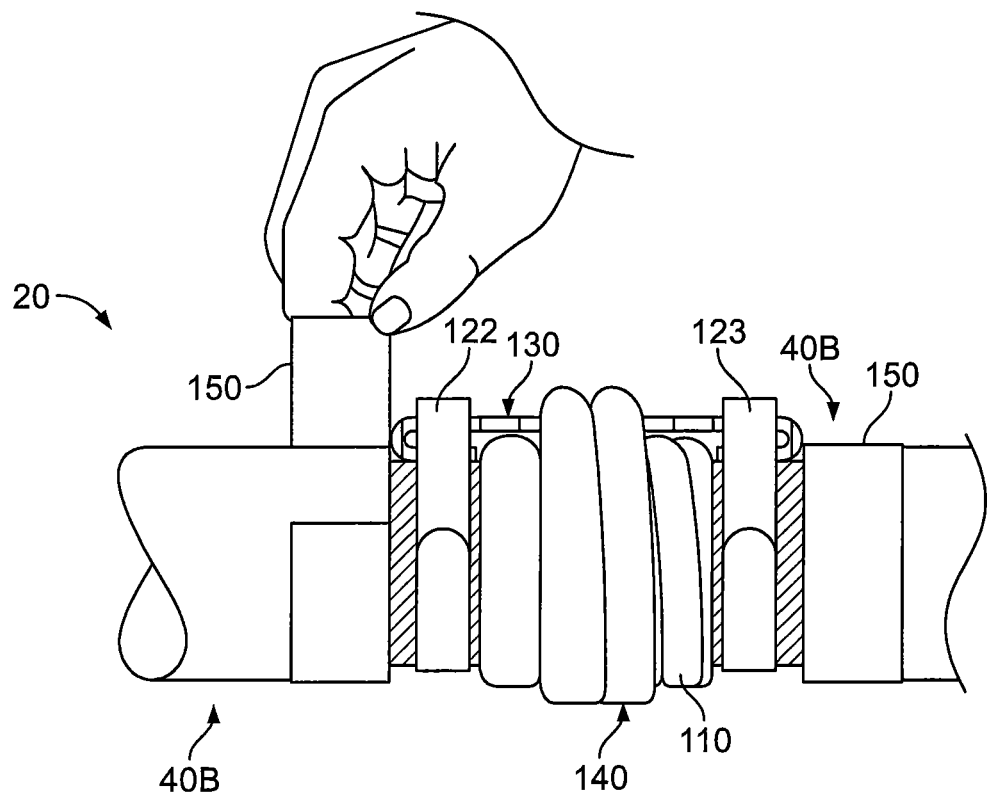
Figure 13:
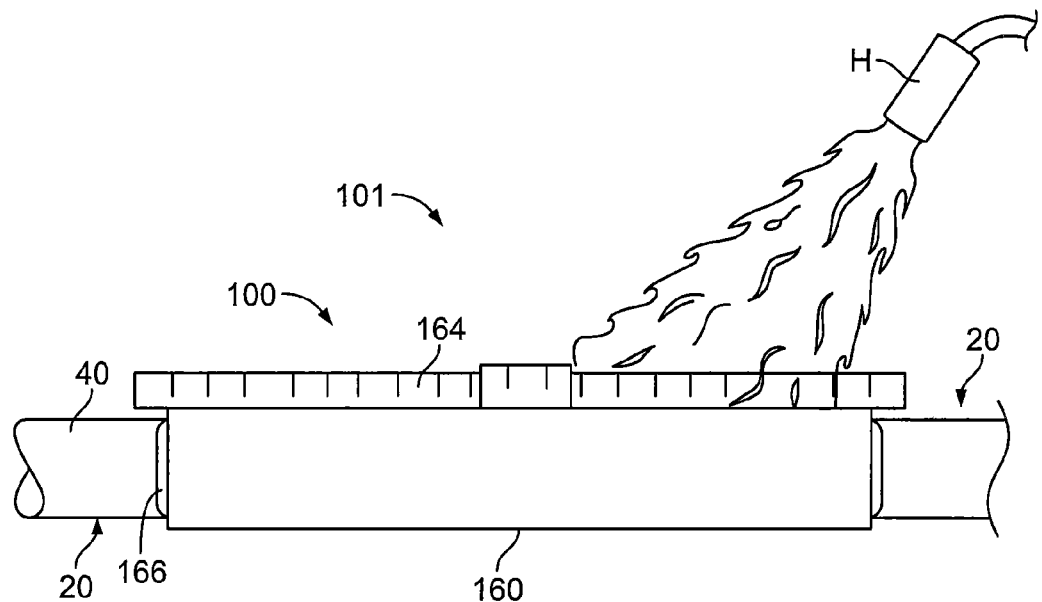

The cable sealing system 100 includes a pair of holding clamps 104, 105 (FIG. 5), self-adhesive metal (e.g., copper) tape 106, 107 (FIG. 7), a first or inner sealant mass 110 (FIG. 8), a pair of anchor clamps 122, 123 (FIG. 10), a jumper member 130 (FIG. 10), a second or outer sealant mass 140 (FIG. 11), end sealant masses 150 (FIG. 12), and an outer protective sleeve 160 (FIG. 13). A cutting tool K (FIG. 5; e.g., a sharp edged tool such as a knife or razor) and a heating tool H (FIG. 13; e.g., a heat gun or torch) may be used to install the system 100.

The clamps 104, 105, 122, 123 may be any suitable clamping devices. In some embodiments, the clamps 122, 123 are the same as the clamps 104, 105 (i.e., the clamps 104, 105 are temporarily installed and then re-used as the clamps 122, 123) or may be a different set of clamps.

Each clamp 104, 105, 122, 123 defines a through passage 104A. According to some embodiments and as illustrated, each clamp 104, 105, 122, 123 is a spring clamp. In some embodiments and as illustrated, each clamp 104, 105, 122, 123 is a spirally wound or coiled roll spring clamp. In some embodiments and as shown, each clamp 104, 105, 122, 123 is formed as a spirally wound flat strip 104B that is pre-formed or pre-tensioned to assume or bias toward a prescribed relaxed inner diameter, but which can be resiliently flexed or bent out of its spiral shape to form a side opening to laterally (or radially) receive an elongate object into the through passage 104A of the spring clamp. The spring clamp so constructed will return to its spirally wound configuration and may lie flat when released.

The clamps 104, 105, 122, 123 may be formed of any suitable material. According to some embodiments the clamps 122, 123, at least, are formed of an electrically conductive material such as metal. In some embodiments, the clamps 122, 123 are formed of stainless steel. According to some embodiments, the strip 104B forming each clamp 122, 123 has a thickness in the range of from about 10 to 50 mils and a width W3 (FIG. 4) in the range of from about 0.75 to 2.5 inches.

The first sealant mass 110 may be a mass of any suitable sealant. According to some embodiments, the sealant 110 is a flowable, conformable medium. According to some embodiments, the sealant 110 is a mastic. According to some embodiments, the sealant 110 is self-adhesive and, in some embodiments, a self-adhesive mastic. In some embodiments, the sealant 110 is a conformable, flowable, electrically insulative mastic. In some embodiments, the mastic is a rubber-based mastic. In some embodiments, the mastic is a butyl rubber-based mastic. Examples of suitable mastics may include S1278 mastic available from TE Connectivity.

Figure 8:
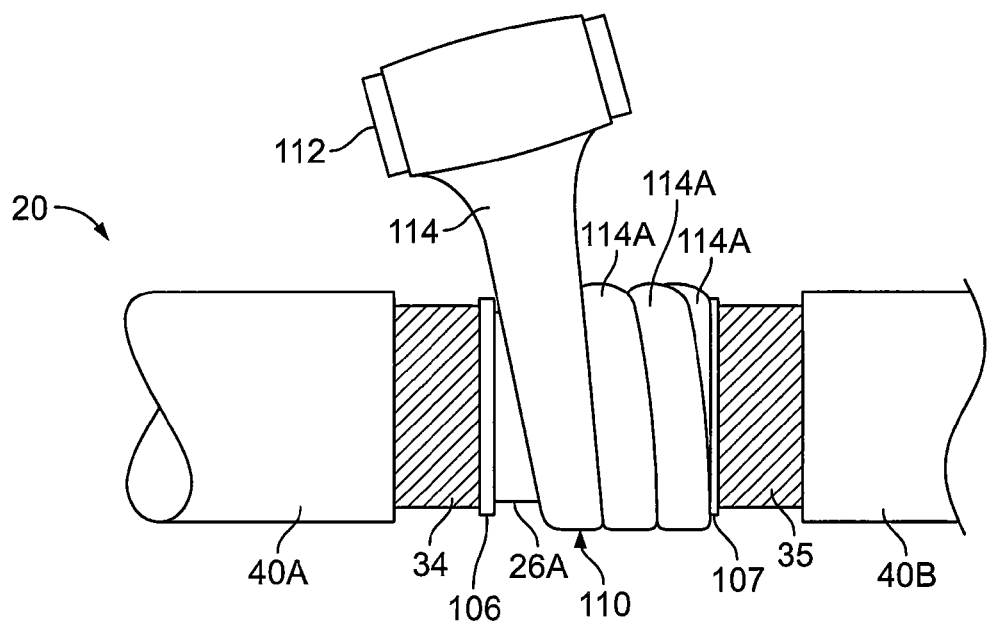

In some embodiments and as illustrated in FIG. 8, the sealant 110 is provided as a strip 114 of the sealant. The strip 114 may be initially provided as or on a roll 112 from which the strip 114 is unwound during installation.

The second sealant mass 140 may likewise be a mass of any suitable sealant. According to some embodiments, the sealant 140 is a sealant as described above for the sealant 110. The sealant masses 110 and 140 may be formed of the same or different materials from one another.

Each end sealant mass 150 may be a mass of any suitable sealant. According to some embodiments, the sealant 150 is a flowable, conformable medium. According to some embodiments, the sealant 150 is a mastic. According to some embodiments, the sealant 150 is self-adhesive and, in some embodiments, a self-adhesive mastic. In some embodiments, the sealant 150 is a conformable, flowable, electrically insulative mastic. In some embodiments, the mastic is a butyl rubber mastic. In some embodiments, the mastic is an EPDM mastic. Examples of suitable mastics may include S1278 butyl rubber mastic available from TE Connectivity. The sealant 150 may be provided as a tape or strip(s) of the sealant.

Figure 9:
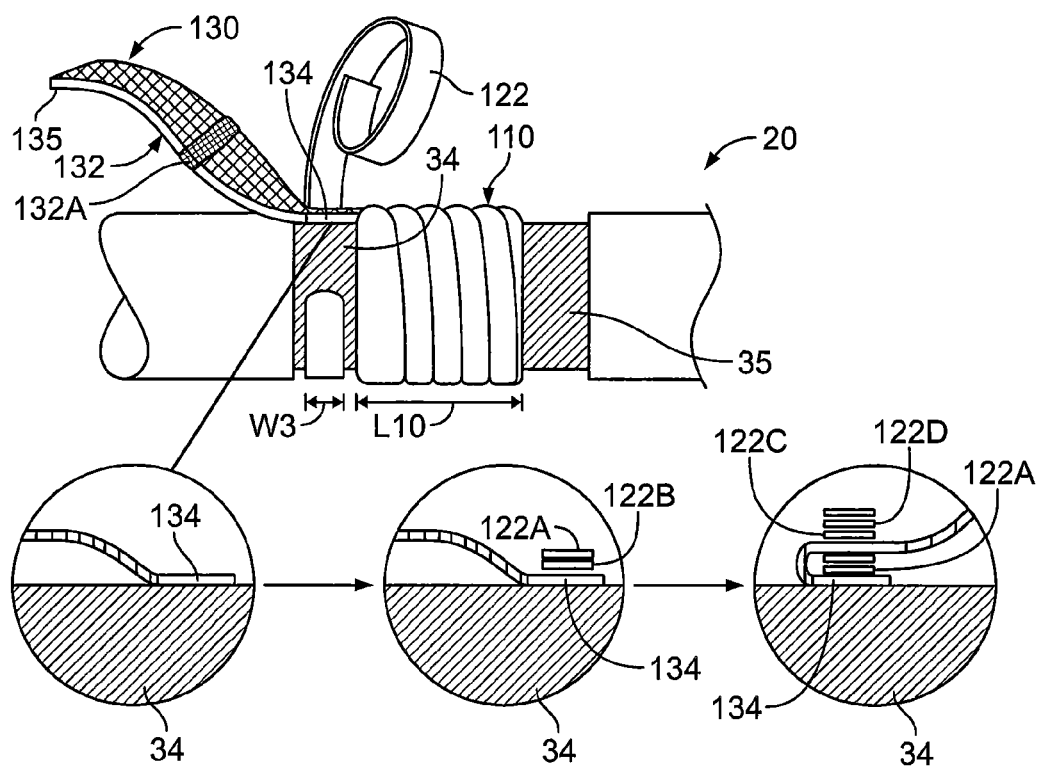

With reference to FIG. 9, the jumper member 130 is elongate and includes a midsection 132 and end sections 134, 135 extending in opposed directions from the midsection 132. The midsection 132 includes a moisture impermeable block section 132A. The end sections 134, 135 are flexible or pliable. In some embodiments, the jumper member 130 is formed of a continuous, flexible, electrically conductive metal braid or mesh with solder filling the interstices in the braid or mesh in the block section 132A. In some embodiments, the jumper member 130 is formed of a copper braid or mesh solder blocked in this manner.

The outer sleeve 160 (FIGS. 13 and 14) may be any suitable environmentally protective cable sleeve. In some embodiments and as illustrated, the outer sleeve 160 is a wrap-around sleeve. In some embodiments and as illustrated, the outer sleeve 160 is a heat shrinkable or heat recoverable wrap-around sleeve. The illustrated sleeve includes a sleeve sheet or body 162, closure rails along the axial free edges of the body 162, and a channel 164 configured to secure the rails closed. The wrap-around sleeve 160 may further include a layer of heat-activated adhesive 166 (FIG. 14) on the inner surface of the body 162. In other embodiments, the outer sleeve may be of a different construction or type depending on the requirements of the application. For example, if a terminal end of the cable 20 is readily accessible, an elastomeric tube sleeve may be used.

With reference to FIGS. 2-14, the cable sealing system 100 may be used as follows to form the cable moisture seal assembly 101 in accordance with method embodiments of the invention.

The termination 60 is installed on a terminal end 20A of the cable 20 as shown in FIG. 2. In the illustrated embodiment, the termination 60 is an end termination including an electrically insulating (e.g., elastomeric) sleeve 62 and a connector 64 to which the cable conductor 22 is electrically and mechanically secured or connected within the sleeve 62. The layers 24, 26, 30 and 40 of the cable 20 may be cut back to suitably interconnect the cable 20 with the termination 60 (e.g., in conventional manner). The termination sleeve 62 overlaps and circumferentially surrounds a proximal end section of the cable jacket 40. The cable jacket 40 and the remainder of the cable 20 extend continuously (unbroken) in a distal axial direction D away from the termination 60. The termination 60 may be installed in whole or in part on the cable 20 before or after installed the cable moisture seal assembly 101.

As shown in FIG. 3, an intermediate section 41 of the cable jacket 40 is cut from the jacket 40. The intermediate section 41 can be cut using a cutting tool without severing the underlying metal shield 30 and then stripping the intermediate section 41 away from the remainder of the cable 20.

The intermediate section 41 is spaced apart from the proximal terminal end (which is disposed in the termination sleeve 62) of the cable 20 and the distal terminal end (not shown) of the cable 20 so that a distal jacket section 40A extends in the distal direction D from a circumferential distal jacket terminal edge 44, and a circumferential proximal jacket section 40B extends in a proximal direction P from a proximal jacket terminal edge 45. A jacket opening 42 is thereby defined in the jacket 40 extending axially from the edge 44 to the edge 45 and about the full circumference of the cable 20. The jacket opening 42 defines a sealing region section 109 extending from a first axial end at the edge 44 to a second spaced apart axial end at the edge 45.

According to some embodiments, the axial distance L4 (FIG. 3) from the edge 45 to the proximal terminal edge 40C of the jacket 40 is at least 2 inches. In some, embodiments, the distance L5 from the edge 45 to the terminal termination 60 is in the range of from about 2 to 8 inches.

According to some embodiments, the axial distance L6 from the edge jacket 144 to the jacket edge 45 (Le., the length of the jacket opening 42) is at least 6 inches and, in some embodiments, is in the range of from about 6 to 12 inches.

Figure 4:
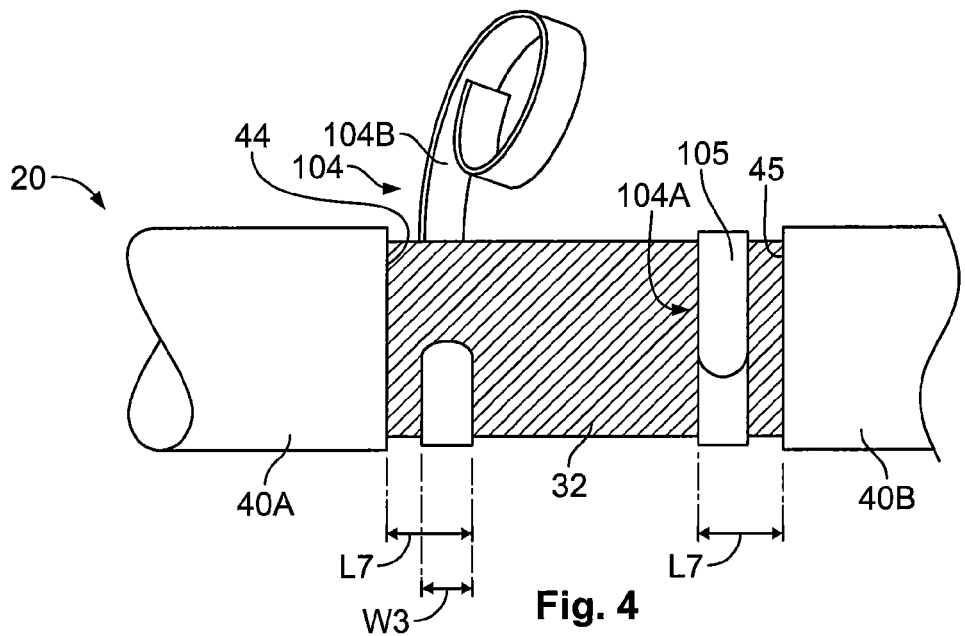
Figure 5:
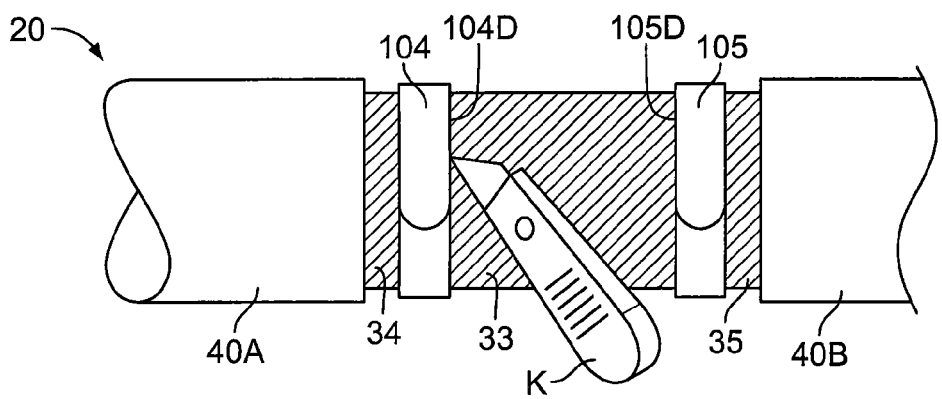

The underlying section 32 of the metal shield 30 is now exposed and intact, as shown in FIGS. 3 and 4. With reference to FIGS. 4 and 5, the spring clamp 104 is applied or wrapped about the exposed shield section 32 such that an inner edge 104D of the clamp 104 is disposed a prescribed distance L7 from the jacket edge 44. Similarly, the spring clamp 105 is applied or wrapped about the exposed shield section 32 such that an inner edge 105D of the clamp 105 is disposed the prescribed distance L7 from the jacket edge 45. The clamps 104, 105 radially compress or load the metal shield 30. According to some embodiments, the distances L7 are each in the range of from about 1 to 4 inches.

Figure 6:
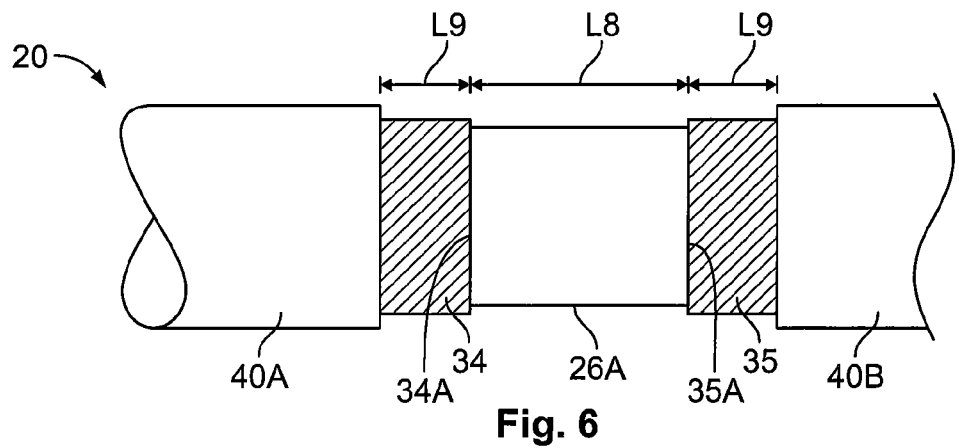

With the metal shield exposed section 32 held down by the clamps 104, 105, the installer severs the exposed section 32 along each clamp edge 104D, 105D (e.g., using the knife K). In some embodiments, the installer lightly scores the metal shield 30 in order to avoid damaging the underlying semiconductor layer 26. A central section 33 of the metal shield 3Q defined between the cut lines (i.e., between the clamp edges 104D, 105D) is then stripped away, leaving behind on the cable 20 a distal exposed metal shield section 34 and a proximal exposed metal shield section 35, as shown in FIG. 6. The sections 34 and 35 have inner terminal edges 34A and 35A, respectively. The clamps 104, 105 are then removed from the cable 20.

An underlying semiconductor layer section 26A is thereby exposed. The exposed semiconductor layer section 26A extends axially from the edge 34A to the edge 35A and about the full circumference of the cable 20.

According to some embodiments, the axial distance L8 (FIG. 6) from the edge 34A to the edge 35A (i.e., the length of the exposed semiconductor layer section 26A) is at least 1 inch and, in some embodiments, is in the range of from about 1 to 6 inches. According to some embodiments, the axial length L9 (FIG. 6) of each of the metal shield end sections 34 and 35 is at least 1 inch and, in some embodiments, is in the range of from about 1 to 4 inches.

Figure 7:
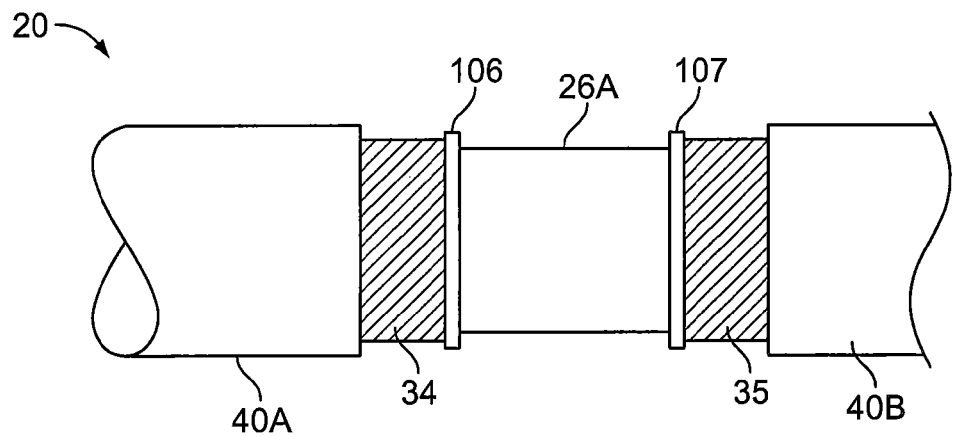

With reference to FIG. 7, the self-adhesive copper tape strips 106 and 107 are then wrapped around the metal shield edges 34A, 35A to secure the edges 34A, 35A. In some embodiments, the copper tape strips 106, 107 are wrapped fully around the cable 20. In some embodiments, the copper tape strips 106, 107 overlap each of the metal shields sections 34, 35 and the exposed semiconductor layer section 26A by an axial distance in the range of from about 0.25 to 1 inch.

The inner moisture blocking sealant mass 110 is then wrapped circumferentially about the cable 20 from the proximal metal shield edge 35A to the distal metal shield edge 34A, as shown in FIGS. 8 and 9. In some embodiments, the inner sealant mass 110 is wound helically about the cable 20 to firm a series of overlapping or imbricated windings 114A. In some embodiments, the inner sealant mass 110 is built up on the exposed semiconductor layer section 26A in this manner until the outer diameter of the first sealant mass 110 is substantially the same as the outer diameter of the cable jacket 22. According to some embodiments and as illustrated in FIG. 9, the exposed semiconductor layer section 26A is substantially completed covered or surrounded by the first sealant mass 110. The sealant 110 may be installed from a roll 112. In some embodiments, the sealant strip 110 is placed under tension and stretched (e.g., to about half its original width) in order to ensure the inner sealant mass 110 bonds to and conforms closely with the semiconductor layer section 26A.

According to some embodiments, the axial length L10 (FIG. 9) of the applied first sealant mass 11Q is at least 1 inch and, in some embodiments, is in the range of from about 1 to 6 inches.

Figure 10:
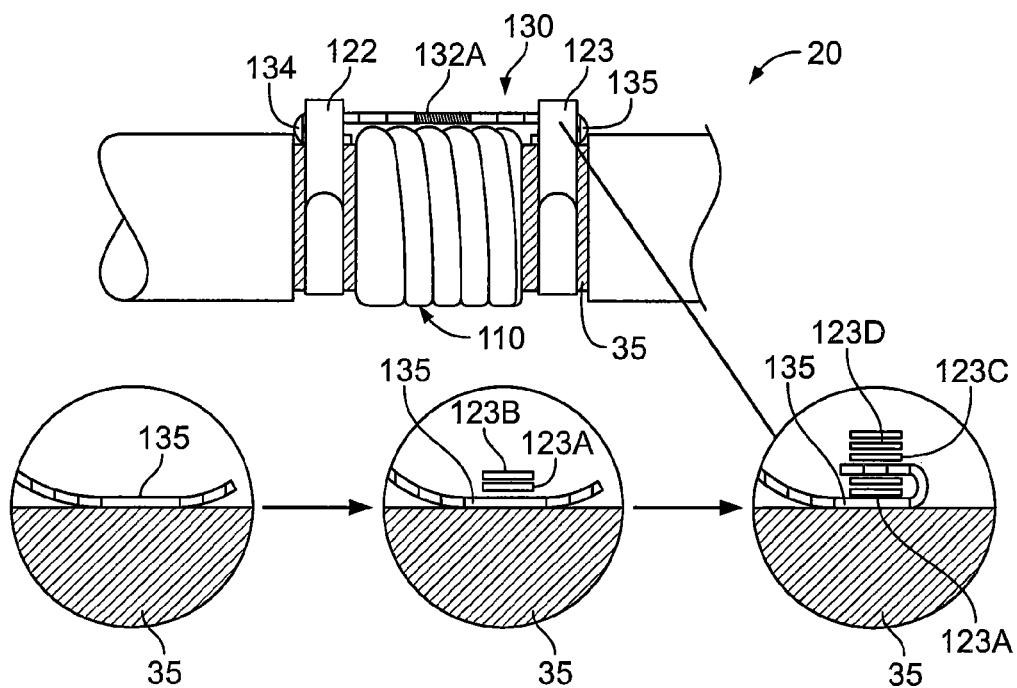

With reference to FIGS. 9 and 10, the jumper member 130 is installed to reconnect (electrically) the metal shield end sections 34 and 35. More particularly and with reference to the sequence illustrated in FIG. 9, the flexible end section 134 of the jumper member 130 is flared and laid onto the end section 34, with the remainder of the jumper member 130 extending away from the first sealant 110. Two windings or wraps 122A, 122B of the spring clamp 122 are made around the end section 134. The end section 134 is then folded back over the wraps 122A, 122B and two more wraps 122C, 122D of the spring clamp 122 are made around the end section 134.

With reference to the sequence illustrated in FIG. 10, the jumper member 130 is then laid across, over and onto the first sealant mass 110. More particularly, the end section 135 is laid onto the metal shield end section 35, the intermediate section 132 spans the sealant mass 110, and the solder block 132A is disposed over the sealant mass 110 and the semiconductor layer section 26A. The flexible end section 135 of the jumper member 130 is flared and laid onto the end section 35. Two windings or wraps 123A, 123B of the spring clamp 123 are made around the end section 135. The end section 135 is then folded back over the wraps 123A, 123B and two more wraps 123C, 123D of the spring clamp 123 are made around the end section 135.

Figure 11:
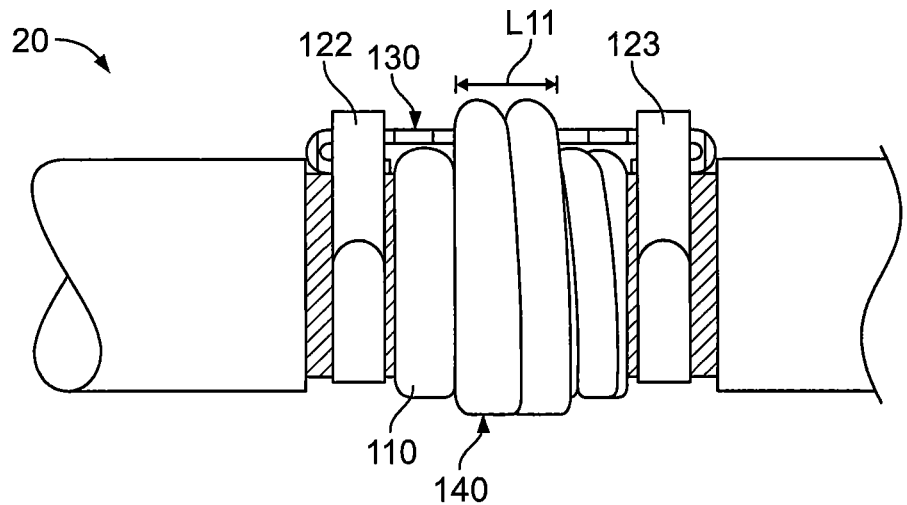

The outer moisture blocking sealant mass 140 is then wrapped circumferentially about the cable 20, the solder block 132A, and the inner sealant mass 110, as shown in FIG. 11. In some embodiments, the outer sealant mass 140 is wound helically about the solder block 132A and the inner sealant mass 110 to form a series of overlapping or imbricated windings. According to some embodiments, the solder block 132A is substantially completed covered or surrounded by the outer sealant mass 140. The sealant 140 may be installed from a roll. In some embodiments, the outer sealant strip 140 is placed under tension and stretched (e.g., to about half its original width) in order to ensure the sealant mass 140 bonds to and conforms closely with the solder block 132A and the sealant mass 110. As will be appreciated from FIGS. 12 and 14, the sealant masses 110, 140 bond to and collectively fully circumferentially surround the solder blocked section 132A of the jumper member 130.

According to some embodiments, the axial length L11 (FIG. 11) of the applied second sealant mass 140 engaging the solder block 132A is at least 1 inch and, in some embodiments, is in the range of from about 1 to 4 inches.

With reference to FIG. 12, the end sealant strips 150 are then applied about the end sections 40A, 40B of the jacket 40 adjacent the jacket terminal edges 44, 45. Prior to applying the sealant strips 150, the end sections 40A, 40B may be cleaned (e.g., with a solvent) and/or abraded.

Figure 14:
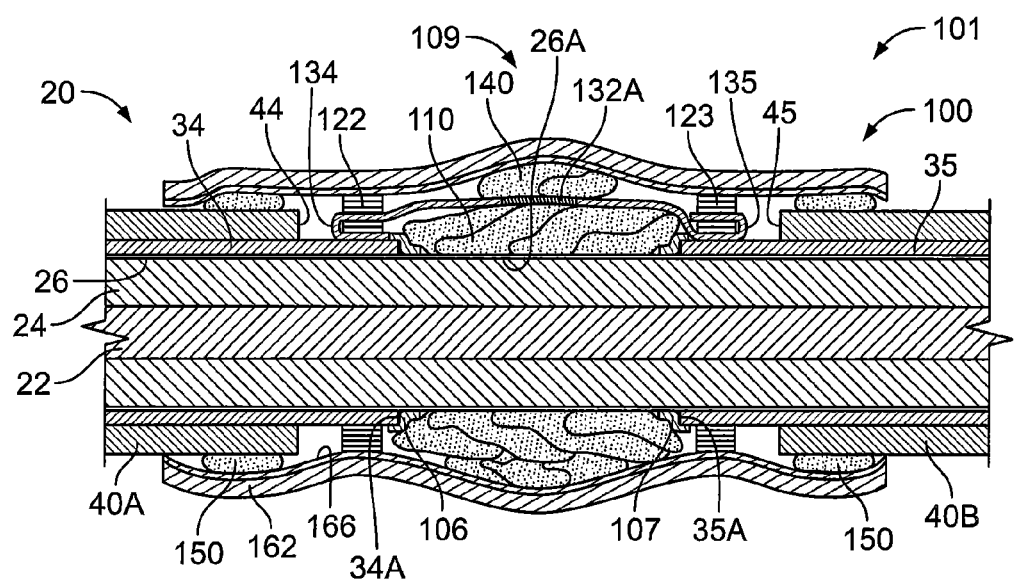
FIG. 14 is a longitudinal cross-sectional view of a sealed cable assembly according to embodiments of the invention including the cable of FIG. 1 and the cable sealing system.

The outer sleeve 160 is then installed, as shown in FIGS. 13 and 14. In the illustrated embodiment, the outer sleeve 160 is wrapped about the cable 20 such that the outer sleeve 160 overlaps and sealingly engages the outer sealant strips 150 and spans the distance therebetween. If present, a release liner of the outer sleeve 160 is first removed. The free axially extending edges of the outer sleeve 160 are closed and secured (e.g., as illustrated, by the channel 164 that couples with integral underlying rails). The heating tool H is then used to contract the outer sleeve 160 about the cable 20 and the sealed region. The outer sleeve 160 is bonded to the cable jacket 22 by the sealant strips 150 and the adhesive 166, and to the regions of the cable 20 therebetween by the sealants 110, 140 and the adhesive 166.

Once installed, the cable moisture seal assembly 101 serves or operates as an internal (to the cable 20) cable jacket moisture seal block. The moisture barrier sealants 110, 140 bond to the semiconductor layer 26A, the solder blocked section 132A, and the inner surface of the outer sleeve 160 to physically block moisture from moving longitudinally down cable 20 through the cable moisture seal assembly 101. The solder blocked section 132A is itself impervious to moisture, so that moisture that migrates into the jumper member 130 from one end cannot migrate through the jumper member 130 to the opposite end. According to some embodiments, the cable sublayers below the metal shield layer 30 (i.e., the semiconductor layer 26 and the cable insulation layer 24) are substantially impervious to moisture intrusion.

The cable moisture seal assembly 101 is positioned in a midsection or intermediate section of the cable 20 such that the jacket 40 extends into and out from the cable moisture seal assembly 101 in both axial directions. The conductor 22, the cable insulation 24 and the semiconductor layer 26 remain intact, continuous and unbroken throughout the cable moisture seal assembly 101.

The aforementioned internal seal can protect downstream components (e.g., the termination 60) from moisture that penetrates the cable jacket 22 upstream of the cable moisture seal assembly 101. That is, the cable moisture seal assembly 101 prevents moisture from inside cable jacket upstream thereof from intruding downstream. In this way, the cable moisture seal assembly 101 can prevent or inhibit moisture from getting into the interface between the cable and a downstream cable accessory or termination, thereby mitigating moisture ingress failures and improving longevity. According to some embodiments, the cable moisture seal assembly is fully impervious to migration fully therethrough (i.e., from one axial end of the sealing region section 109 to the opposite axial end) for all intended conditions in service. In some embodiments, the cable moisture seal assembly can withstand pressures in the cable up to at least 50 psi.

While the cable moisture seal assembly 101 is shown and described adjacent and upstream of a cable end termination, it may be located adjacent other type accessory or termination, such as a cable joint (e.g., a splice or disconnectable or non-disconnectable joint), or connector. The cable moisture seal assembly 101 may be located in an intermediate section of a cable that is not adjacent a termination. For example, in some embodiments, the cable moisture seal assembly 101 can be located in a cable between high and low sections of cable to keep moisture from migrating into lower section from the higher section.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A sealed cable assembly comprising:
    a cable including a cable subcore, a metal shield layer surrounding the cable subcore, and a jacket surrounding the metal shield layer, wherein the cable subcore includes an electrical conductor surrounded by an electrical insulation layer; and
    a cable moisture seal assembly including a sealant, an electrically conductive jumper member, and an outer sleeve;
    wherein:
        the cable includes a sealing region section extending from a first axial end to a second axial end, and in which a section of the jacket and a section of the metal shield layer are removed to expose a section of the cable subcore;
        the insulation layer and the conductor extend through the sealing region section;
        the jacket includes first and second jacket terminal edges, the first and second jacket terminal edges being axially spaced apart, the sealing region section being disposed between the first and second jacket terminal edges;
        a first section of the jacket extends from the first jacket terminal edge in a first direction away from the sealing region section;
        a second section of the jacket extends from the second jacket terminal edge in a second direction away from the sealing region section and opposite the first direction;
        first and second sections of the metal shield layer extend away from the sealing region section in the first and second opposed directions, respectively;
        the outer sleeve surrounds the sealing region section;
        the sealant is disposed radially between the cable subcore and the outer sleeve, and engages the cable subcore to form a moisture barrier in the sealing region section between the first and second sections of the jacket;
        the jumper member electrically connects the first and second sections of the metal shield layer; and
        the conductor and the insulation layer extend fully through the sealing region section and remain intact, continuous and unbroken throughout the sealing region section;
    wherein:
        the cable subcore includes a semiconductor layer surrounding the insulation layer;
        the sealant engages the semiconductor layer to form the moisture barrier; and
        the semiconductor layer extends fully through the sealing region section and remains intact, continuous and unbroken throughout the sealing region section.

2. The sealed cable of claim 1 wherein the moisture barrier is impermeable to migration of moisture.

3. The sealed cable assembly of claim 1 wherein the sealant is a flowable, self-adhesive, electrically insulative mastic.

4. The sealed cable assembly of claim 3 wherein the sealant is a butyl rubber-based mastic.

5. The sealed cable assembly of claim 1 wherein the cable moisture seal assembly includes first and second end sealants radially interposed between the outer sleeve and the first and second sections of the jacket, respectively.

6. The sealed cable assembly of claim 1 wherein the outer sleeve includes an inner adhesive layer.

7. A sealed cable assembly comprising:
    a cable including a cable subcore, a metal shield layer surrounding the cable subcore, and a jacket surrounding the metal shield layer, wherein the cable subcore includes an electrical conductor surrounded by an electrical insulation layer; and
    a cable moisture seal assembly including a sealant, an electrically conductive jumper member, and an outer sleeve;
    wherein:
        the cable includes a sealing region section extending from a first axial end to a second axial end, and in which a section of the jacket and a section of the metal shield layer are removed to expose a section of the cable subcore;
        the insulation layer and the conductor extend through the sealing region section;
        the jacket includes first and second jacket terminal edges, the first and second jacket terminal edges being axially spaced apart, the sealing region section being disposed between the first and second jacket terminal edges;
        a first section of the jacket extends from the first jacket terminal edge in a first direction away from the sealing region section;
        a second section of the jacket extends from the second jacket terminal edge in a second direction away from the sealing region section and opposite the first direction;

first and second sections of the metal shield layer extend away from the sealing region section in the first and second opposed directions, respectively;

the outer sleeve surrounds the sealing region section;

the sealant is disposed radially between the cable subcore and the outer sleeve, and engages the cable subcore to form a moisture barrier in the sealing region section between the first and second sections of the jacket; and the jumper member electrically connects the first and second sections of the metal shield layer;

the first section of the metal shield layer includes a first exposed shield section extending axially between the first jacket terminal edge and the exposed section of the cable subcore; and the second section of the metal shield layer includes a second exposed shield section extending axially between the second jacket terminal edge and the exposed section of the cable subcore;

the jumper member electrically contacts the first and second exposed shield sections to electrically connect the first and second sections of the metal shield layer;

the jumper member includes:
a moisture impermeable midsection overlying the exposed section of the cable subcore; and
first and second flexible end sections extending from opposed ends of the midsection and engaging the first and second exposed sections of the metal shield, respectively;

the end sections of the jumper member are formed of a metal braid; and the midsection of the jumper member is formed of a solder blocked metal braid.

8. The sealed cable assembly of claim 7 wherein the cable moisture seal assembly includes self-adhesive metal tape securing terminal edges of the first and second exposed shield sections to the cable subcore.

9. The sealed cable assembly of claim 7 wherein the cable moisture seal assembly includes a pair of circumferential clamps securing first and second opposed ends of the jumper member to the first and second exposed shield sections, respectively.

10. The sealed cable assembly of claim 9 wherein the clamps are metal spring clamps.

11. A method for forming a sealed cable assembly, the method comprising:

providing a cable including a cable subcore, a metal shield layer surrounding the cable subcore, and a jacket surrounding the metal shield layer, wherein the cable subcore includes an electrical conductor surrounded by an electrical insulation layer;

removing a section of the jacket and removing a section of the metal shield layer to form a sealing region section extending from a first axial end to a second axial end and wherein a section of the cable subcore is exposed, wherein:
the insulation layer and the conductor extend through the sealing region section;
the jacket includes first and second jacket terminal edges, the first and second jacket terminal edges being axially spaced apart, the sealing region section being disposed between the first and second jacket terminal edges;
a first section of the jacket extends from the first jacket terminal edge in a first direction away from the sealing region section;
a second section of the jacket extends from the second jacket terminal edge in a second direction away from the sealing region section and opposite the first direction; and
first and second sections of the metal shield layer extend away from the sealing region section in the first and second opposed directions, respectively;

applying a sealant to the cable subcore;

electrically connecting the first and second sections of the metal shield layer using an electrically conductive jumper member; and mounting an outer sleeve to surround the sealing region section;

wherein the sealant is disposed radially between the cable subcore and the outer sleeve, and engages the cable subcore to form a moisture barrier in the sealing region section between the first and second sections of the jacket;

wherein the conductor and the insulation layer extend fully through the sealing region section and remain intact, continuous and unbroken throughout the sealing region section. and wherein:
the cable subcore includes a semiconductor layer surrounding the insulation layer;
applying the sealant to the subcore includes applying the sealant directly to the semiconductor layer; and
the semiconductor layer extends fully through the sealing region section and remains intact, continuous and unbroken throughout the sealing region section.

12. The method of claim 11 wherein the sealant is a flowable, self-adhesive, electrically insulative mastic.

13. A sealed cable assembly comprising:

a cable including a cable subcore, a metal shield layer surrounding the cable subcore, and a jacket surrounding the metal shield layer, wherein the cable subcore includes an electrical conductor surrounded by an electrical insulation layer; and a cable moisture seal assembly including a sealant, an electrically conductive jumper member, and an outer sleeve;

wherein:
the cable includes a sealing region section extending from a first axial end to a second axial end, and in which a section of the jacket and a section of the metal shield layer are removed to expose a section of the cable subcore;
the insulation layer and the conductor extend through the sealing region section;
first and second sections of the jacket extend away from the sealing region section in first and second opposed directions, respectively;
first and second sections of the metal shield layer extend away from the sealing region section in the first and second opposed directions, respectively;
the outer sleeve surrounds the sealing region section;
the sealant is disposed radially between the cable subcore and the outer sleeve, and engages the cable subcore to form a moisture barrier in the sealing region section between the first and second sections of the jacket;
the jumper member electrically connects the first and second sections of the metal shield layer; and
the sealant includes:
an inner sealant engaging the cable subcore and the jumper member and interposed between the cable subcore and the jumper member; and an outer sealant engaging the jumper member and interposed between the jumper member and the outer sleeve.

14. The sealed cable assembly of claim 13 wherein:
the jacket includes first and second jacket terminal edges, the first and second jacket terminal edges being axially spaced apart, the sealing region section being disposed between the first and second jacket terminal edges;
the first section of the jacket extends from the first jacket terminal edge in a first direction away from the sealing region section;
the second section of the jacket extends from the second jacket terminal edge in a second direction away from the sealing region section and opposite the first direction; and
the conductor and the insulation layer extend fully through the sealing region section and remain intact, continuous and unbroken throughout the sealing region section.

15. A method for forming a sealed cable assembly, the method comprising:
providing a cable including a cable subcore, a metal shield layer surrounding the cable subcore, and a jacket surrounding the metal shield layer, wherein the cable subcore includes an electrical conductor surrounded by an electrical insulation layer;
removing a section of the jacket and removing a section of the metal shield layer to form a sealing region section extending from a first axial end to a second axial end and wherein a section of the cable subcore is exposed, wherein:
the insulation layer and the conductor extend through the sealing region section;
first and second sections of the jacket extend away from the sealing region section in first and second opposed insertions, respectively; and
first and second sections of the metal shield layer extend away from the sealing region section in the first and second opposed directions, respectively;
applying an inner sealant to the cable subcore;
electrically connecting the first and second sections of the metal shield layer using an electrically conductive jumper member, including mounting the jumper member over the inner sealant;
applying an outer sealant over the jumper member; and
mounting an outer sleeve over the outer sealant to surround the sealing region section;
wherein the inner sealant is disposed radially between the cable subcore and the outer sleeve, and engages the cable subcore to form a moisture barrier in the sealing region section between the first and second sections of the jacket.

16. The method of claim 15 wherein:
the jacket includes first and second jacket terminal edges, the first and second jacket terminal edges being axially spaced apart, the sealing region section being disposed between the first and second jacket terminal edges;
the first section of the jacket extends from the first jacket terminal edge in a first direction away from the sealing region section;
the second section of the jacket extends from the second jacket terminal edge in a second direction away from the sealing region section and opposite the first direction; and the conductor and the insulation layer extend fully through the sealing region section and remain intact, continuous and unbroken throughout the sealing region section.

17. A sealed cable assembly comprising:
a cable including a cable subcore, a metal shield layer surrounding the cable subcore, and a jacket surrounding the metal shield layer, wherein the cable subcore includes an electrical conductor surrounded by an electrical insulation layer; and
a cable moisture seal assembly including a sealant, an electrically conductive jumper member, and an outer sleeve;
wherein:
the cable includes a sealing region section extending from a first axial end to a second axial end, and in which a section of the jacket and a section of the metal shield layer are removed to expose a section of the cable subcore;
the insulation layer and the conductor extend through the sealing region section;
the jacket includes first and second jacket terminal edges, the first and second jacket terminal edges being axially spaced apart, the sealing region section being disposed between the first and second jacket terminal edges;
a first section of the jacket extends from the first jacket terminal edge in a first direction away from the sealing region section;
a second section of the jacket extends from the second jacket terminal edge in a second direction away from the sealing region section and opposite the first direction;
first and second sections of the metal shield layer extend away from the sealing region section in the first and second opposed directions, respectively;
the outer sleeve surrounds the sealing region section;
the sealant is disposed radially between the cable subcore and the outer sleeve, and engages the cable subcore to form a moisture barrier in the sealing region section between the first and second sections of the jacket; and
the jumper member electrically connects the first and second sections of the metal shield layer;
the first section of the metal shield layer includes a first exposed shield section extending axially between the first jacket terminal edge and the exposed section of the cable subcore; and
the second section of the metal shield layer includes a second exposed shield section extending axially between the second jacket terminal edge and the exposed section of the cable subcore;
the jumper member electrically contacts the first and second exposed shield sections to electrically connect the first and second sections of the metal shield layer; and
the cable moisture seal assembly includes self-adhesive metal tape securing terminal edges of the first and second exposed shield sections to the cable subcore.

18. A sealed cable assembly comprising:
a cable including a cable subcore, a metal shield layer surrounding the cable subcore, and a jacket surrounding the metal shield layer, wherein the cable subcore includes an electrical conductor surrounded by an electrical insulation layer; and a cable moisture seal assembly including a sealant, an electrically conductive jumper member, and an outer sleeve;

wherein:

the cable includes a sealing region section extending from a first axial end to a second axial end, and in which a section of the jacket and a section of the metal shield layer are removed to expose a section of the cable subcore;

the insulation layer and the conductor extend through the sealing region section;

the jacket includes first and second jacket terminal edges, the first and second jacket terminal edges being axially spaced apart, the sealing region section being disposed between the first and second jacket terminal edges;

a first section of the jacket extends from the first jacket terminal edge in a first direction away from the sealing region section;

a second section of the jacket extends from the second jacket terminal edge in a second direction away from the sealing region section and opposite the first direction;

first and second sections of the metal shield layer extend away from the sealing region section in the first and second opposed directions, respectively;

the outer sleeve surrounds the sealing region section;

the sealant is disposed radially between the cable subcore and the outer sleeve, and engages the cable subcore to form a moisture barrier in the sealing region section between the first and second sections of the jacket;

the jumper member electrically connects the first and second sections of the metal shield layer;

the conductor and the insulation layer extend fully through the sealing region section and remain intact, continuous and unbroken throughout the sealing region section; and the cable moisture seal assembly includes first and second end sealants radially interposed between the outer sleeve and the first and second sections of the jacket, respectively.

\* \* \* \* \*

UNITED STATES PATENT AND TRADEMARK OFFICE
CERTIFICATE OF CORRECTION

PATENT NO. : 9,786,412 B2  
APPLICATION NO. : 14/662509  
DATED : October 10, 2017  
INVENTOR(S) : Yaworski et al.

Page 1 of 1

It is certified that error appears in the above-identified patent and that said Letters Patent is hereby corrected as shown below:

In the Specification

Column 6, Line 37: Please correct "(Le.," to read -- (i.e., --

Column 6, Line 59: Please correct "3Q" to read -- 30 --

Column 7, Line 40: Please correct "11Q" to read -- 110 --

Signed and Sealed this  
Fifth Day of June, 2018

Andrei Iancu  
*Director of the United States Patent and Trademark Office*